US011798514B2

United States Patent
Spitzer et al.

(10) Patent No.: US 11,798,514 B2
(45) Date of Patent: Oct. 24, 2023

(54) METHOD AND SYSTEM FOR CUSTOMIZING OPTIMAL SETTINGS USING END-USER PREFERENCES

(71) Applicant: NVIDIA Corporation, Santa Clara, CA (US)

(72) Inventors: John Spitzer, San Jose, CA (US); Rev Lebaredian, Austin, TX (US); Tony Tamasi, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 11 days.

(21) Appl. No.: 16/953,743

(22) Filed: Nov. 20, 2020

(65) Prior Publication Data

US 2021/0074237 A1 Mar. 11, 2021

Related U.S. Application Data

(63) Continuation of application No. 14/094,291, filed on Dec. 2, 2013, now Pat. No. 10,878,770.

(51) Int. Cl.
*G09G 5/00* (2006.01)
*G06F 3/03* (2006.01)
*G09G 5/36* (2006.01)

(52) U.S. Cl.
CPC .............. *G09G 5/003* (2013.01); *G06F 3/03* (2013.01); *G09G 5/363* (2013.01); *G09G 2320/02* (2013.01); *G09G 2320/0606* (2013.01); *G09G 2340/14* (2013.01); *G09G 2354/00* (2013.01); *G09G 2370/022* (2013.01)

(58) Field of Classification Search
None
See application file for complete search history.

(56) References Cited

U.S. PATENT DOCUMENTS

| | | | |
|---|---|---|---|
| 6,059,842 A | 5/2000 | Dumarot et al. | |
| 6,233,531 B1 | 5/2001 | Klassen et al. | |
| 8,276,133 B1 | 9/2012 | Lebaredian et al. | |
| 8,296,781 B1 | 10/2012 | Lebaredian et al. | |

(Continued)

OTHER PUBLICATIONS

Lebaredian, R., et al., "System, Method, And Computer Program Product For Selling Parameters Associated With An Application And Executing Benchmarks Utilizing The Parameters", NVIDIA Corporation, U.S. Appl. No. 12/352,268, filed Jan. 12, 2009, 29 pages.

*Primary Examiner* — Aaron M Richer
(74) *Attorney, Agent, or Firm* — Taylor English Duma L.L.P.

(57) ABSTRACT

Embodiments of the present invention provide a novel solution that uses subjective end-user input to generate optimal image quality settings for an application. Embodiments of the present invention enable end-users to rank and/or select various adjustable application parameter settings in a manner that allows them to specify which application parameters and/or settings are most desirable to them for a given application. Based on the feedback received from end-users, embodiments of the present invention may generate optimal settings for whatever performance level the end-user desires. Furthermore, embodiments of the present invention may generate optimal settings that may be benchmarked either on a server farm or on an end-user's client device.

20 Claims, 10 Drawing Sheets

(56) References Cited

U.S. PATENT DOCUMENTS

| | | | |
|---|---|---|---|
| 8,854,457 B2 * | 10/2014 | De Vleeschouwer | H04N 5/268 |
| | | | 348/135 |
| 8,864,583 B1 * | 10/2014 | Lotzer | A63F 13/352 |
| | | | 463/31 |
| 8,908,987 B1 | 12/2014 | Krishnaswamy et al. | |
| 9,201,670 B2 | 12/2015 | Spitzer | |
| 9,275,377 B2 | 3/2016 | Spitzer et al. | |
| 10,509,658 B2 | 12/2019 | Spitzer et al. | |
| 2002/0093518 A1 * | 7/2002 | Nakano | H04N 5/44513 |
| | | | 345/643 |
| 2004/0064293 A1 | 4/2004 | Hamilton et al. | |
| 2006/0265192 A1 | 11/2006 | Turricchi, Jr. | |
| 2007/0061802 A1 | 3/2007 | Tan et al. | |
| 2008/0021994 A1 | 1/2008 | Grelewicz et al. | |
| 2008/0033696 A1 | 2/2008 | Aguaviva et al. | |
| 2008/0141131 A1 | 6/2008 | Cerny et al. | |
| 2008/0150937 A1 * | 6/2008 | Lundstrom | G06T 15/005 |
| | | | 345/419 |
| 2008/0226178 A1 | 9/2008 | Penke et al. | |
| 2008/0235075 A1 | 9/2008 | Couture et al. | |
| 2008/0293499 A1 | 11/2008 | Brewer et al. | |
| 2009/0258708 A1 * | 10/2009 | Figueroa | A63F 13/49 |
| | | | 463/43 |
| 2011/0018884 A1 | 1/2011 | Ritts et al. | |
| 2011/0148899 A1 | 6/2011 | Dumbeck et al. | |
| 2011/0244879 A1 | 10/2011 | Siomina et al. | |
| 2012/0209571 A1 | 8/2012 | Peterson et al. | |
| 2013/0002968 A1 | 1/2013 | Bridge et al. | |
| 2013/0052959 A1 | 2/2013 | Rubin et al. | |
| 2013/0262986 A1 * | 10/2013 | Leblond | G06F 40/194 |
| | | | 715/236 |
| 2014/0011581 A1 | 1/2014 | Spitzer et al. | |
| 2014/0267439 A1 | 9/2014 | Jenkins | |
| 2015/0002681 A1 | 1/2015 | Gong et al. | |
| 2015/0119149 A1 | 4/2015 | Spitzer et al. | |

* cited by examiner

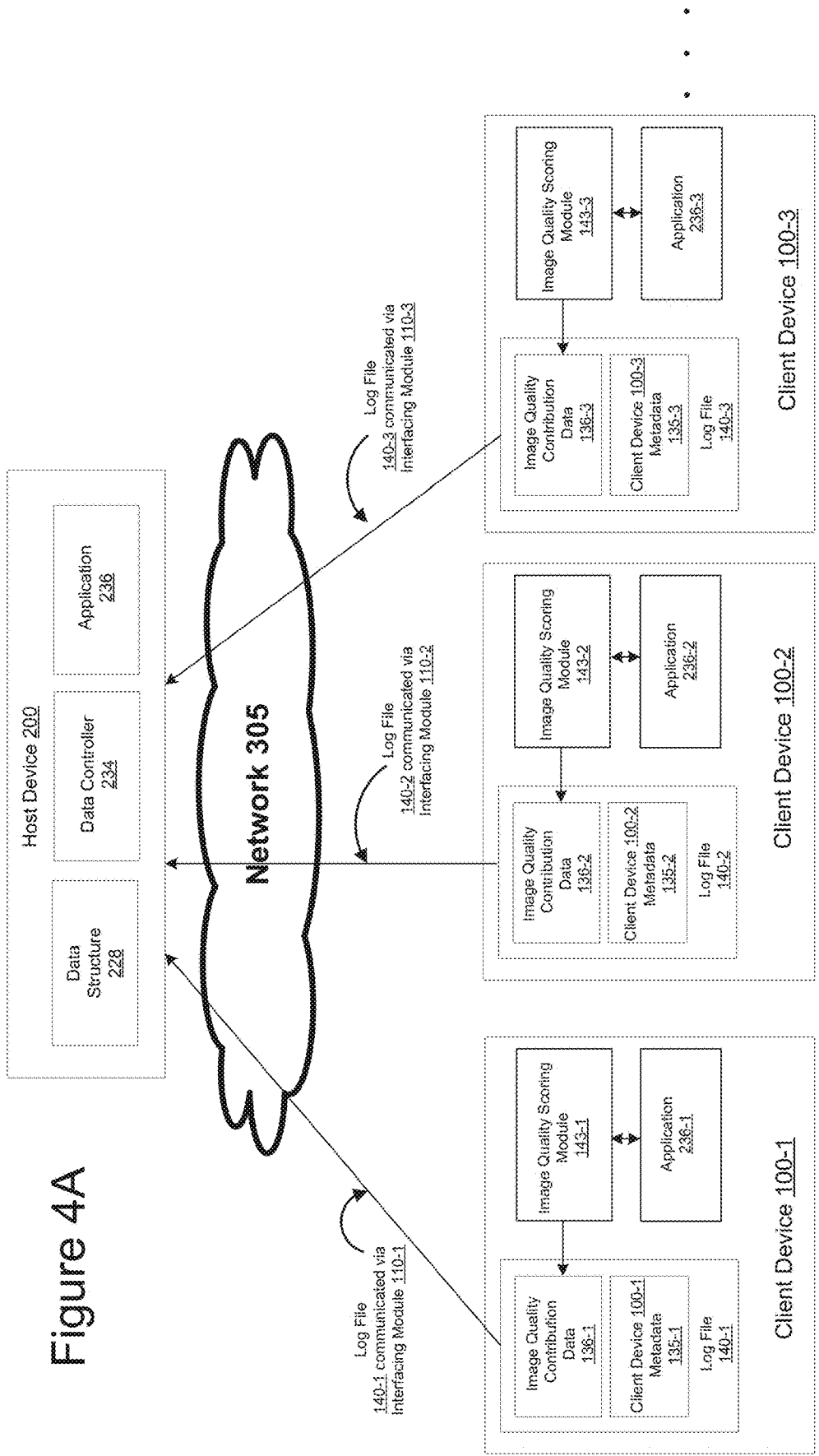

Exemplary Optimized Image Quality Presets 237

METHOD AND SYSTEM FOR CUSTOMIZING OPTIMAL SETTINGS USING END-USER PREFERENCES

RELATED APPLICATIONS

This application is a continuation of U.S. patent application Ser. No. 14/094,291, titled "METHOD AND SYSTEM FOR CUSTOMIZING OPTIMAL SETTINGS USING END-USER PREFERENCES," filed Dec. 2, 2013 which is incorporated herein by reference in its entirety.

FIELD OF THE INVENTION

Embodiments of the present invention are generally related to the field of graphics processing.

BACKGROUND OF THE INVENTION

End-user metrics are increasingly being collected and aggregated for purposes of improving an end-user's experience when executing a computer application. For example, when executing a video game, conventional methods of data gathering collect end-user metric data, e.g., computer performance levels executing an application, from the end-user's gaming system for server-side analysis to gain perspective on the end-user's gaming experience. As such, gathering performance data in this manner may be beneficial for purposes of analyzing aspects of the video game's execution which may degrade the quality of the end-user's gaming experience if too low.

However, when performing optimization procedures for an application, conventional methods often optimize the performance of the application at the expense of not fully optimizing the image quality of the application. This is generally due to the fact that image quality is subjective and determinations as to what constitutes "optimal" image quality settings may vary among different end-users. As such, conventional methods are generally ineffective when determining optimal image quality settings for an end-user.

SUMMARY OF THE INVENTION

Accordingly, a need exists for a solution that can generate optimal or custom image quality settings for a particular end-user in a more effective and efficient manner. Embodiments of the present invention provide a novel solution that collects and uses subjective end-user input to generate optimal or custom image quality settings for an application used by a particular end-user. Embodiments of the present invention enable end-users to rank and/or select various adjustable application parameter settings in a manner that allows them to specify which application parameters and/or settings are most desirable to them, as it relates to image quality, for a given application. Based on the feedback received from end-users, embodiments of the present invention generate optimal or customized settings for whatever performance level the end-user desires. Furthermore, embodiments of the present invention generate the optimal or customized settings that may be benchmarked either on a server farm or on an end-user's client device.

More specifically, in one embodiment, the present invention is implemented as a method of generating analyzed configurations for an application. The method includes, using a client device, gathering subjective end-user feedback concerning a set of adjustable application parameters in which the set of adjustable application parameters includes prescribed image quality settings associated with an application. In one embodiment, the gathering further includes gathering the subjective end-user feedback responsive to a prompt received for an end-user to define a desirable setting level for each parameter associated with the set of adjustable application parameters.

In one embodiment, the gathering further includes displaying a plurality of different pre-defined setting levels for a specific parameter and prompting said client device to select a desirable pre-defined setting level from the plurality of different pre-defined setting levels. In one embodiment, the gathering further includes gathering the subjective end-user feedback during execution of the application. In one embodiment, the gathering further includes gathering the subjective end-user feedback independent of executing the application.

The method also includes calculating an image quality score responsive to the subjective end-user feedback. In one embodiment, the calculating further includes summing a plurality of scalar values assigned to the set of adjustable application parameters which are based on the subjective end-user feedback to compute the image quality score. Furthermore, the method includes communicating the image quality score to a host computer system for generating computed settings for customizing display of the application during execution on the client device. In one embodiment, the communicating further includes communicating hardware configuration information and/or software configuration information associated with the client device to the host computer system.

In one embodiment, the present invention is implemented as a system for generating analyzed configurations for an application. The system includes a gathering module operable to gather subjective end-user feedback concerning a ranking of a set of adjustable application parameters in which the set of adjustable application parameters includes image quality settings associated with an application. In one embodiment, the gathering module is further operable to gather the subjective end-user feedback responsive to a prompt received for an end-user to define a desirable setting level for a parameter associated with the set of adjustable application parameters.

In one embodiment, the gathering module is further operable to gather the subjective end-user feedback during executing of the application. In one embodiment, the gathering module is further operable to gather the subjective end-user feedback independent of executing the application. In one embodiment, the system includes a display module operable to display a plurality of different pre-defined setting levels for a specific parameter and in which the gathering module is operable to gather an end-user selection concerning a desirable pre-defined setting level selected from a selection of the plurality of different pre-defined setting levels.

The system also includes a scoring module operable to calculate an image quality score responsive to the subjective end-user feedback. In one embodiment, the scoring module is further operable to sum a plurality of scalar values assigned to the set of adjustable application parameters which are based on the subjective end-user feedback to compute the image quality score. Furthermore, the system includes a communicating module operable to communicate the image quality score to a host computer system for generating computed settings for customizing display of the application during a future execution on the system based on a prescribed performance level. In one embodiment, the communicating module is further operable to communicate hardware configuration information and/or software configuration information associated with the system to the host computer system.

In one embodiment, the present invention is implemented as a method of communicating analyzed configurations for an application. The method includes, using a host device, receiving subjective end-user feedback concerning a respective set of adjustable application parameters from a plurality of different remote client devices over a communication network, in which each set of adjustable application parameters includes image quality settings associated with an application. In one embodiment, the receiving further includes receiving the subjective end-user feedback responsive to a prompt communicated to an end-user of a client device to define a desirable setting level for a plurality of parameters associated with the set of adjustable application parameters.

In one embodiment, the receiving further includes displaying a plurality of different pre-defined setting levels for a specific parameter to an end-user and prompting the end-user to select a desirable pre-defined setting level from the plurality of different pre-defined setting levels. In one embodiment, the receiving further includes receiving hardware configuration information and/or software configuration information associated with at least one remote client device and in which the generating includes generating the plurality of computed settings responsive to the hardware configuration information and/or software configuration information.

The method also includes, using the subjective end-user feedback, generating a plurality of computed settings for the plurality of different remote client devices, in which each of the computed settings is for improving display of the application during execution on a respective remote client device. In one embodiment, the subjective end-user feedback includes an image quality score computed by the remote client device, in which the image quality score is computed based on a plurality of summed scalar values of the set of adjustable parameters.

In one embodiment, the plurality of computed settings are generated through benchmark testing performed on the remote client device. Furthermore, the method includes communicating the plurality of computed settings for receipt by the plurality of different remote client devices over the communication network.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 4A depicts an exemplary network communication between a host device and a plurality of remote client devices for generating optimal image quality settings using subjective end-user feedback received from a client device in accordance with embodiments of the present invention.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follow are presented and discussed in terms of a process. Although operations and sequencing thereof are disclosed in a figure herein (e.g., FIG. 5) describing the operations of this process, such operations and sequencing are exemplary. Embodiments are well suited to performing various other operations or variations of the operations recited in the flowchart of the figure herein, and in a sequence other than that depicted and described herein.

As used in this application the terms controller, module, system, and the like are intended to refer to a computer-related entity, specifically, either hardware, firmware, a combination of hardware and software, software, or software in execution. For example, a module can be, but is not limited to being, a process running on a processor, an integrated circuit, a subject, an executable, a thread of execution, a program, and or a computer. By way of illustration, both an application running on a computing device and the computing device can be a module. One or more modules can reside within a process and/or thread of execution, and a component can be localized on one computer and/or distributed between two or more computers. In addition, these modules can be executed from various computer readable media having various data structures stored thereon.

Exemplary Client Device

Figure 1A:
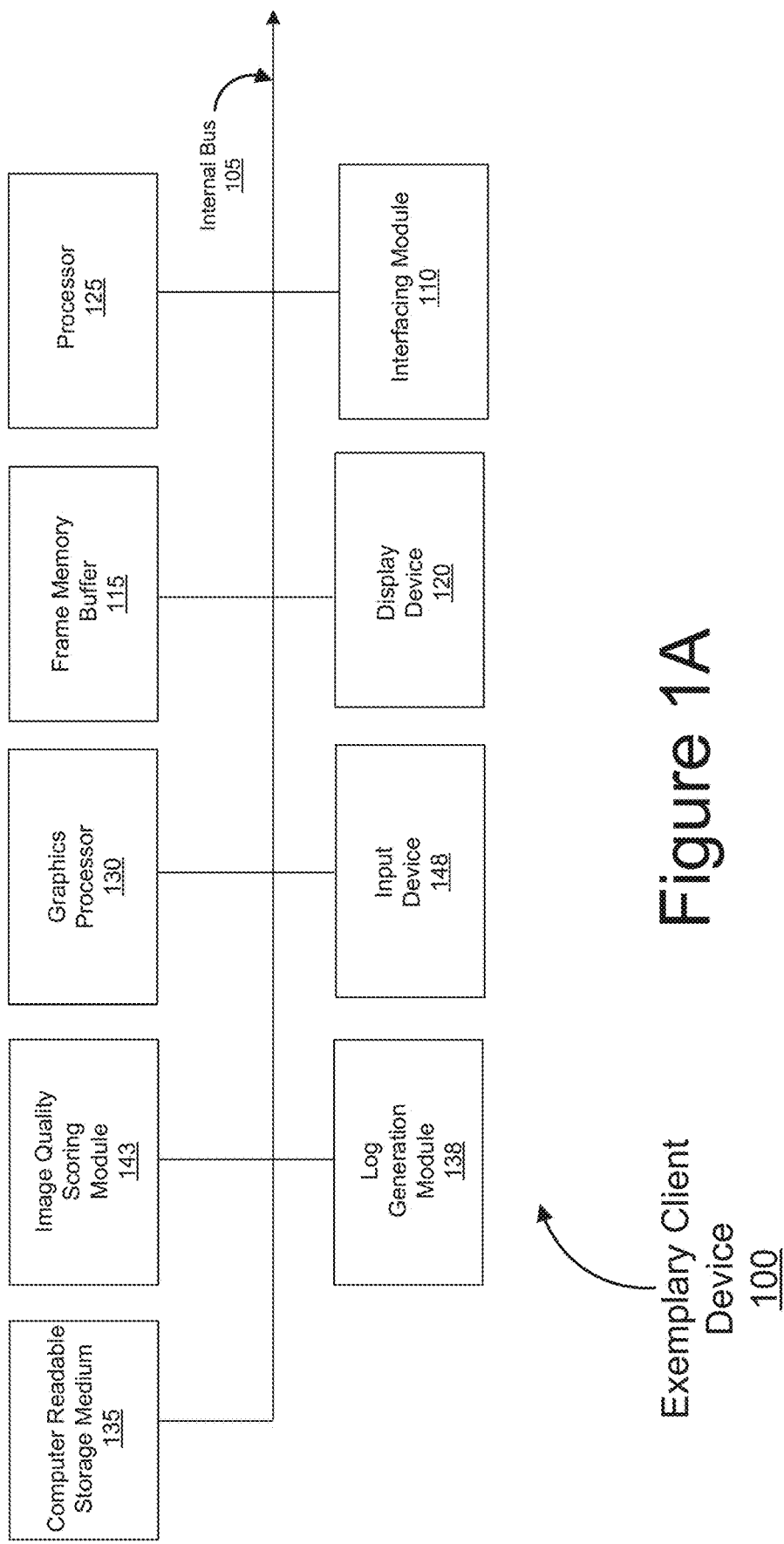
FIG. 1A depicts an exemplary client device capable of gathering subjective end-user feedback in accordance with embodiments of the present invention.

As presented in FIG. 1A, an exemplary client device 100 upon which embodiments of the present invention may be implemented is depicted. Client device 100 may be implemented as an electronic device (e.g., desktop computers, laptop computers, tablet PCs, smartphones, etc.) capable of communicating with other computer systems. Furthermore, client device 100 may be any type of device that has the capability to receive inputs from a user and send such inputs to a host computer system.

According to one embodiment, client device 100 may include interfacing module 110, image quality scoring module 143, log generation module 138, graphics processor 130, frame memory buffer 115, input device 148, processor 125, display device 120 and computer readable storage medium 135. According to one embodiment, some or all of the components of client device 100 (e.g., image quality scoring module 143, log generation module 138, graphics processor 130 and/or frame memory buffer 115) may be included as part of a graphics system (e.g., graphics driver) residing in memory within client device 100. Depending on the exact configuration and type of computing system environment, computer readable storage medium 135 may be volatile (such as RAM), non-volatile (such as ROM, flash memory, etc.) or some combination of the two. Portions of computer readable storage medium 135 when executed facilitate efficient execution of memory operations or requests for groups of threads.

Interfacing module 110 may include the functionality to communicate with other computer systems (e.g., host computer system) via an electronic communications network, including wired and/or wireless communication and including the Internet. In one embodiment, interfacing module 110 may be configured to communicate data between client device 100 and other computer systems over a communications network during fixed time periods or varying time periods. For instance, interfacing module 110 can be configured to periodically receive communications (e.g., surveys) from a host computer system prompting an end-user to provide feedback concerning at set of adjustable application parameter settings associated with a particular application.

For instance, Table I provides an exemplary set of adjustable application parameters (e.g., in-game settings) associated with an application (e.g., video game). As illustrated by Table I, application parameters may include, but are not limited to, anti-aliasing, anisotropic filtering, water quality, shadow quality, texture quality, etc.

TABLE I

| | |
|---|---|
| Anti-Aliasing | [off, 2×, 4×, . . . ] |
| Anisotropic Filtering | [off, 2×, 4×, . . . ] |
| Water Quality | [0, 1, 2, 3 . . . ] |
| Shadow Quality | [0, 1, 2, 3 . . . ] |
| Texture Quality | [0, 1, 2, 3 . . . ] |
| Set of Image Quality Parameters | Range of Values Associated with Parameter |

As such, each application parameter may include a set of levels that may be adjusted in accordance with end-user feedback to alter execution of an application. For instance, as illustrated in Table I, application parameters may include a set of adjustable levels in which each successive level indicates that the image quality displayed by the client device increases when compared to a previous value (e.g., "off", 2×, 4×, etc.). As such, a number of different configurations may be generated by the end-user using the adjustable application parameters, which may provide varying degrees of subjective image quality to the user during execution of an application.

Image quality scoring module 143 may include the functionality to assign and/or correlate scalar values to various levels associated with an application parameter for purposes of calculating image quality contribution scores. In effect, this may include a ranking of which parameters are more important to the user with respect to image quality for the user. In one embodiment, scalar values may be based on a scale of "0" to "1", in which "0" means that the parameter provides no image quality contribution and "1" means that the parameter provides a desired maximum image contribution. For instance, in one embodiment, image quality scoring module 143 may determine that a parameter setting by the user to "off" yields no image quality contribution by the parameter (e.g., anti-aliasing). Image quality scoring module 143 may also determine that an adjustment of the setting from "off" to "2×" by the user yields an image quality contribution value of "0.15". Similarly, image quality scoring module 143 may also determine that an adjustment of the setting from "2×" to "4×" by the user yields an image quality contribution value of "0.25", etc. In this manner, a plurality of different application parameters may be similarly adjusted and yield a corresponding image quality contribution value.

Figure 1B:
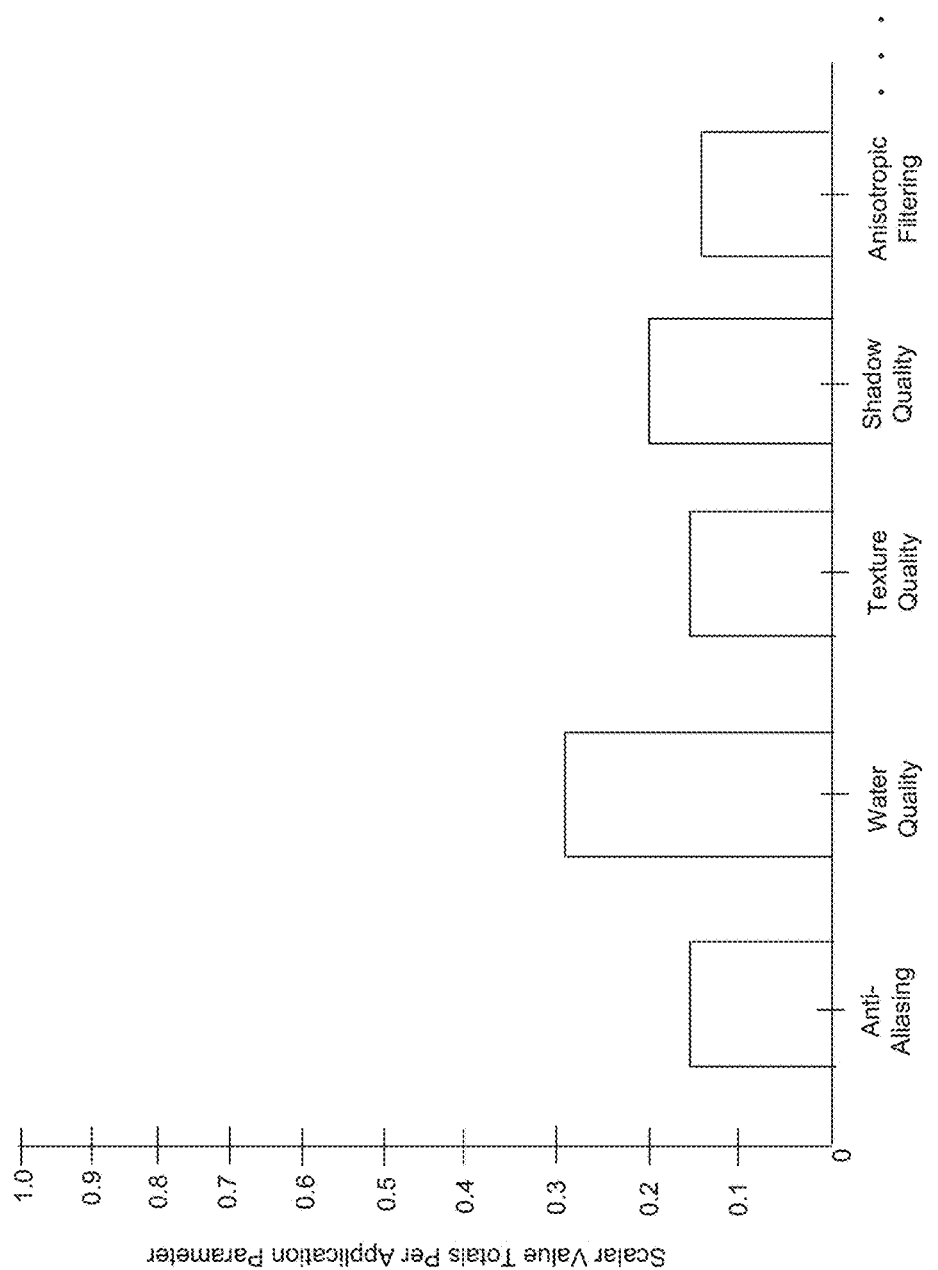
FIG. 1B depicts a set of image quality contribution scores calculated for a particular combination of application parameters in accordance with embodiments of the present invention.

According to one embodiment, image quality scoring module 143 may also include the functionality to perform summation operations to determine image quality contribution totals for a given combination of application parameters. FIG. 1B depicts a set of image quality contribution scores influenced by user-input with respect to subjective image quality and calculated for a particular combination of application parameters in accordance with embodiments of the present invention. As depicted in FIG. 1B, image quality scoring module 143 may calculate a total image contribution score of "0.95" for a combination of application parameters selected by an end-user in which image quality scoring module 143 determined that the anti-aliasing parameter setting yielded an image contribution score of 0.15; the water quality parameter setting yielded an image contribution score of 0.30; the texture quality parameter setting yielded contribution score of 0.15; the shadow quality parameter setting yielded image contribution value of 0.20; and the anisotropic filtering parameter setting yielded image contribution value of 0.15. In this manner, an evaluator (e.g., a host computer system) may use image quality contribution totals calculated by image quality scoring module 143 for use in server-side analysis and/or optimization procedures for an application.

Log generation module 138 of FIG. 1A may include the functionality to generate log files using data received from image quality scoring module 143. For instance, in one embodiment, log generation module 138 may be configured to record and/or store calculations performed by image quality scoring module 143 within generated log files. Additionally, in one embodiment, log generation module 138 may include the functionality to incorporate client device metadata within the log files generated. Metadata created by log generation module 138 may include the definitions of various parameters associated with software and/or hardware configurations for client device 100. For example, in one embodiment, metadata created by log generation module 138 may include definitions concerning application settings, hardware configuration information (e.g., CPU capabilities, GPU capabilities, monitor resolution information, etc.) and the like. Also, in one embodiment, interfacing module 110 may be configured to communicate log files generated by log generation module 138.

Processor 125 may include the functionality to read and process instructions for running software applications and optionally an operating system. Input device 148 may be a device capable of receiving user input including, but not limited to, a keyboard, mice, joystick, and/or touch screen display, or the like. Furthermore, display device 120 may include the functionality to display output. Examples of display device 120 may include, but are not limited to, a liquid crystal display (LCD), a plasma display, cathode ray tube (CRT) monitor, etc.

Graphics processor 130 may be operable to process instructions from applications resident on client device 100 and to communicate data with processor 125 via internal bus 105 for rendering the data on display device 120. Graphics processor 130 generates pixel data for output images from rendering commands and may be configured as multiple virtual graphic processors that are used in parallel (concurrently) by a number of applications executing in parallel.

Frame memory buffer 115 may be used for storing pixel data for each pixel of an output image. According to one embodiment, frame memory buffer may be configured to render (e.g., in combination with graphics processor 130) multi-dimensional graphics (e.g., 2D graphics, 3D graphics, etc.) associated with an application. In one embodiment, frame memory buffer 115 and/or other memory may be part of memory resident on client device 100 which may be shared with processor 125 and/or graphics processor 130. Additionally, in another embodiment, client device 100 may include additional physical graphics processors, each configured similarly to graphics processor 130. These additional graphics processors may be configured to operate in parallel with graphics processor 130 to simultaneously generate pixel data for different portions of an output image, or to simultaneously generate pixel data for different output images.

Exemplary Host Device

Figure 2:
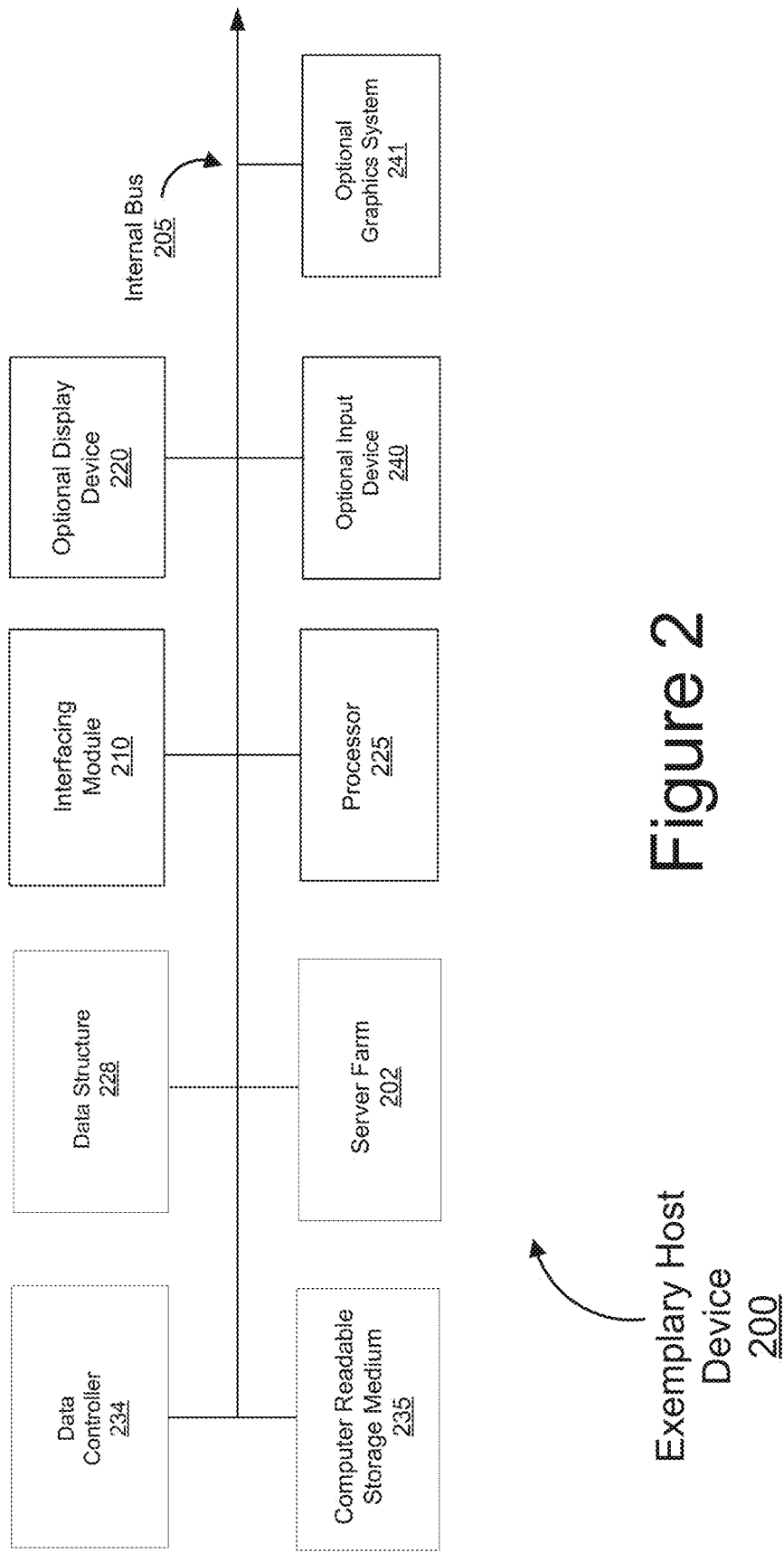
FIG. 2 depicts an exemplary host device capable of generating optimal image quality settings using subjective end-user feedback received from a client device in accordance with embodiments of the present invention.

As presented in FIG. 2, an exemplary host system upon which embodiments of the present invention may be implemented is depicted. Exemplary host device 200 may be implemented as a server, laptop, desktop computer or the like, as contemplated by embodiments of the present invention. In one embodiment of the present invention, host device 200 may be a virtualized server device in a data center. According to one embodiment, host device 200 may include data controller 234, data structure 228, interfacing module 210, optional display device 220, computer readable storage medium 235, server farm 202, optional input device 240, processor 225, and optional graphics system 241. In one embodiment, host device 200 may be communicably coupled to server farm 202. Depending on the exact configuration and type of computing system environment, computer readable storage medium 235 may be volatile (such as RAM), non-volatile (such as ROM, flash memory, etc.) or some combination of the two. Portions of computer readable storage medium 235 when executed facilitate efficient execution of memory operations or requests for groups of threads.

Interfacing module 210 may include the functionality to communicate with other computer systems (e.g., client device 100) via an electronic communications network, including wired and/or wireless communication and including the Internet. In one embodiment, interfacing module 210 may be configured to communicate with other computer systems (e.g., client devices) over a communications network during fixed time periods or varying time periods. According to one embodiment, interfacing module 210 may receive instructions from data controller 234 to periodically communicate requests (e.g., surveys) that prompt end-users to provide feedback concerning at set of adjustable application parameter settings associated with a particular application.

Data structure 228 may include the functionally to store end-user feedback data received from client devices via interfacing module 210. According to one embodiment, data structure 228 may be operable to store image quality contribution scores calculated by a client device (e.g., via image quality scoring module 143), user-defined FPS rates (e.g., minimum/maximum FPS rates, average FPS rates, etc.) for executing an application, and/or client device metadata that includes information concerning a hardware/software profile associated with a client device.

Data controller 234 may include the functionality to receive and process data stored in data structure 228. According to one embodiment, data controller 234 may include the functionality to use data gathered from client devices to determine acceptable and/or unacceptable performance and/or image quality levels for executing an application on a client device based on a particular hardware and/or software configuration associated with the client device. For example, in one embodiment, data controller 234 may be configured to use data received from log files (e.g., image quality contribution scores calculated by a client device, user-defined FPS rates, and/or client device metadata) to perform acceptability tests (e.g., "benchmarking" tests) for an application.

Server farm 202 may comprise a plurality of different computer systems accessible to host device 200, in which each computer system comprises a different hardware and/or software profile (e.g., varying CPU capabilities, GPU capabilities, monitor resolution capabilities, etc.). As such computers system within server farm 202 may represent a vast array of hardware and/or software profiles that may be capable of executing an application using a multitude of different settings. Accordingly, data controller 234 may include the functionality to estimate which hardware and/or software profiles from server farm 202 best match the hardware and/or software configuration of a particular client device (e.g., client device 100) when performing optimization procedures for that specific client device.

Additionally, server farm 202 can use data included within the log files received from a client device as inputs to generate optimal image quality settings for executing an application on the end-user's client device. For instance, in one embodiment, server farm 202 can calculate optimal or customized values for a plurality of different application parameters based on user-specified data concerning the subjective impact of the parameter on image quality, user-prescribed performance levels (e.g., user-defined FPS rates) and/or a hardware/software profiles selected by the data controller 234. Optimal or customized settings generated by server farm 202 may be communicated back to client devices via interface module 210.

Processor 225 may include the functionality to read and process instructions for running software applications and optionally an operating system. Optional input device 240 may be a device capable of receiving user input including, but not limited to, a keyboard, mice, joystick, and/or touch screen display, or the like. Optional graphics system 241 may comprise components similar to the graphics system of client device 100 (e.g., see FIG. 1A). As such, optional graphics system 241 may include the functionality to generate a stream of rendered data to be delivered to client devices over a network. Furthermore, optional display device 220 may include the functionality to display output. Examples of optional display device 220 may include, but are not limited to, a liquid crystal display (LCD), a plasma display, cathode ray tube (CRT) monitor, etc.

Exemplary Method for Gathering Subjective End-User Feedback Concerning Image Quality Contributions for an Application As described herein, end-users can be prompted by a host computer system via their respective client devices to provide feedback concerning the subjective importance of a set of adjustable application parameter settings associated with a particular application with respect to image quality. In one embodiment, end-users can be prompted with surveys (e.g., AB tests) to provide the feedback regarding a set of adjustable application parameter settings. For instance, FIG. 3A depicts an exemplary image quality determination process and exemplary GUI in which end-users can express feedback concerning desirable image quality parameters in accordance with embodiments of the present invention.

Figure 3A:
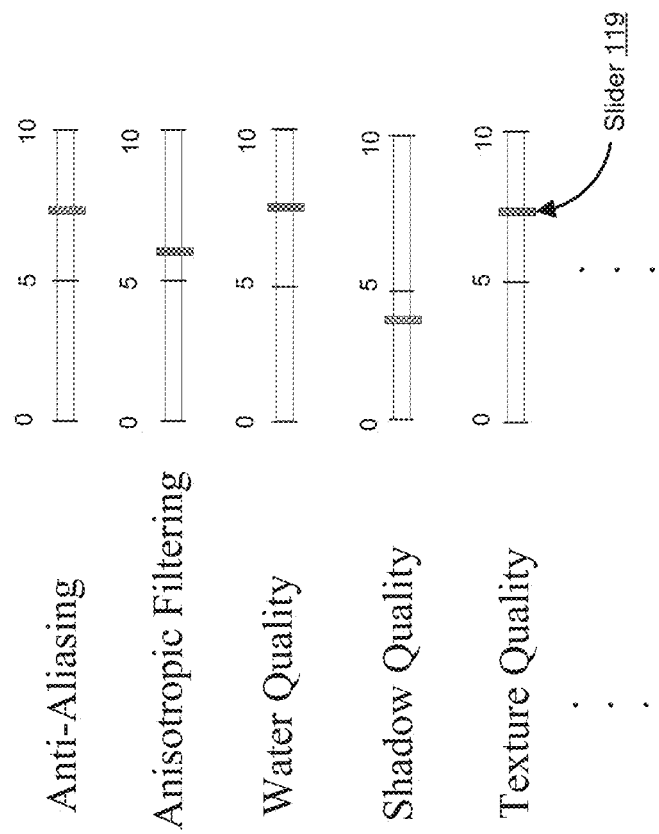
FIG. 3A depicts an exemplary image quality determination process in accordance with embodiments of the present invention.

As illustrated in FIG. 3A, an end-user may receive an on-screen survey (e.g., survey 120-1) on his client device, which can be displayed via a display screen (e.g., display screen 120) coupled to the device. In one embodiment, survey 120-1 can be communicated to the client device over a communications network from a host computer system (e.g., host device 200) configured to evaluate responses provided by the end-user. Survey 120-1 prompts the end-user to define desirable image quality contributions for a set of application parameters that may be associated with an application (e.g., video game). In one embodiment, survey 120-1 may be presented to an end-user during execution of an application or upon completion of an application session. In one embodiment, end-users can be prompted to define desirable image quality contributions for each parameter independent of an execution of an application.

As illustrated by the embodiment depicted in FIG. 3A, an end-user can provide feedback for each individual application parameter (e.g., through rankings) using a sliding scale or other means of communicating their desired image quality contribution value feedback. Accordingly, the image quality contribution scores associated with selections made by an end-user can be recorded and stored in memory resident on the client device for further processing (e.g., processing by image quality scoring module 143). According to one embodiment, surveys prompting end-users to define image quality contributions for a given application may be based on a particular performance level (e.g., frames per second or "FPS"). For instance, the setting for texture quality is higher than the setting for shadow quality, indicating that texture quality is more important to the user than shadow quality in accordance with user's subjective determination of image quality.

For instance, as illustrated in FIG. 3A, feedback may be based on a particular performance level preference previously expressed to the host computer system by the end-user as desirable (e.g., end-user expressing "60 FPS" as a desirable performance level for a particular application). According to one embodiment, end-users may be prompted with a plurality of surveys in which end-users are asked to define desirable image quality contributions for a set of different of application parameters at various performance levels (e.g., determining image quality contribution for a combination of application parameters at 50 FPS, 60 FPS, 70 FPS, etc.).

Figure 3B:
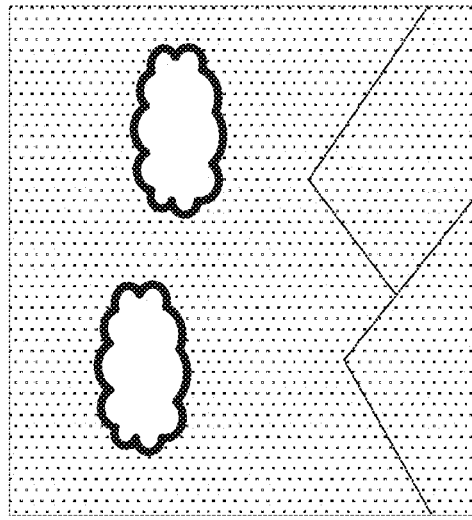
FIG. 3B depicts another exemplary image quality determination process in accordance with embodiments of the present invention.
Figure 3B:
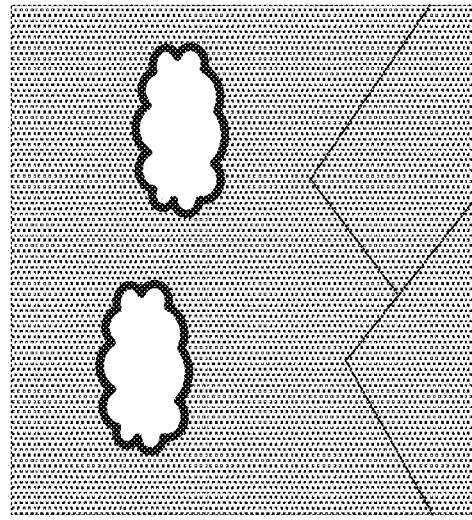
Figure 3B:
Figure 3B:

FIG. 3B depicts another exemplary image quality determination process in which end-users may express feedback concerning a desirable set of pre-determined application parameter settings for an application in accordance with embodiments of the present invention. As illustrated by the embodiment depicted in FIG. 3B, survey 120-2 may include a plurality of different video clips (e.g., adjusted frame sets 311, 312) which may be rendered to a display device (e.g., display device 120) coupled to an end-user's client device. Adjusted frames sets 311 and 312 may be rendered at a pre-determined frame rate (e.g., 40 FPS) which may be based on a preference previously expressed by the end-user as desirable. In one embodiment, adjusted frame sets 311 and 312 may be rendered simultaneously or at different times. Furthermore, in one embodiment, end-users may or may not be made aware of how adjusted frames sets 311 and 312 are adjusted.

Adjusted frame sets 311 and 312 may each represent different simulated application sessions of a particular application that are each adjusted according to a different set of predetermined application parameter settings. In one embodiment, adjusted frames sets 311 and 312 may each include an application parameter that may be adjusted differently for each frame set according to a pre-determined setting (e.g., "shadow quality level 1" for adjusted frame set 311 vs. "shadow quality level 2" for adjusted frame set 312, etc.). As such, a set of image quality contribution scores may be pre-calculated for each adjusted frame set. In one embodiment, pre-determined application parameter settings may be determined by an evaluator (e.g., host device 200). In this manner, according to one embodiment of the present invention, a host computer system (e.g., host device 200) may include the functionality to record and compute image quality contribution scores (image quality "weights") associated with selections made by an end-user using a module similar to image quality scoring module 143.

As illustrated in FIG. 3B, upon completion of viewing adjusted frames sets 311 and 312, end-users may express preferences through placement of a mark next to a preferred set of pre-determined application parameter settings (e.g., checkmark placed within a radio field). According to one embodiment, users may use touchscreen displays to express preferences. In one embodiment, the user may express preferences by ranking adjusted frames sets 311 and 312. For instance, adjusted parameter settings rated as the most aesthetically pleasing may receive a higher rank than those deemed less aesthetically pleasing.

In one embodiment, adjusted frame sets 311 and 312 may be adjusted by a combination of different adjustable application parameters (e.g., water, quality, anti-aliasing, anisotropic filtering, etc.) and adjusted according to various different pre-determined settings. Furthermore, in one embodiment, a plurality of screen shots may be presented to end-users for selection in which each screen shot is adjusted by an application parameter at different settings. In one embodiment, screen shots presented to end-users for selection may be adjusted by a combination of different adjustable application parameters (e.g., water, quality, anti-aliasing, anisotropic filtering, etc.) according to various different pre-determined settings.

Figure 3C:
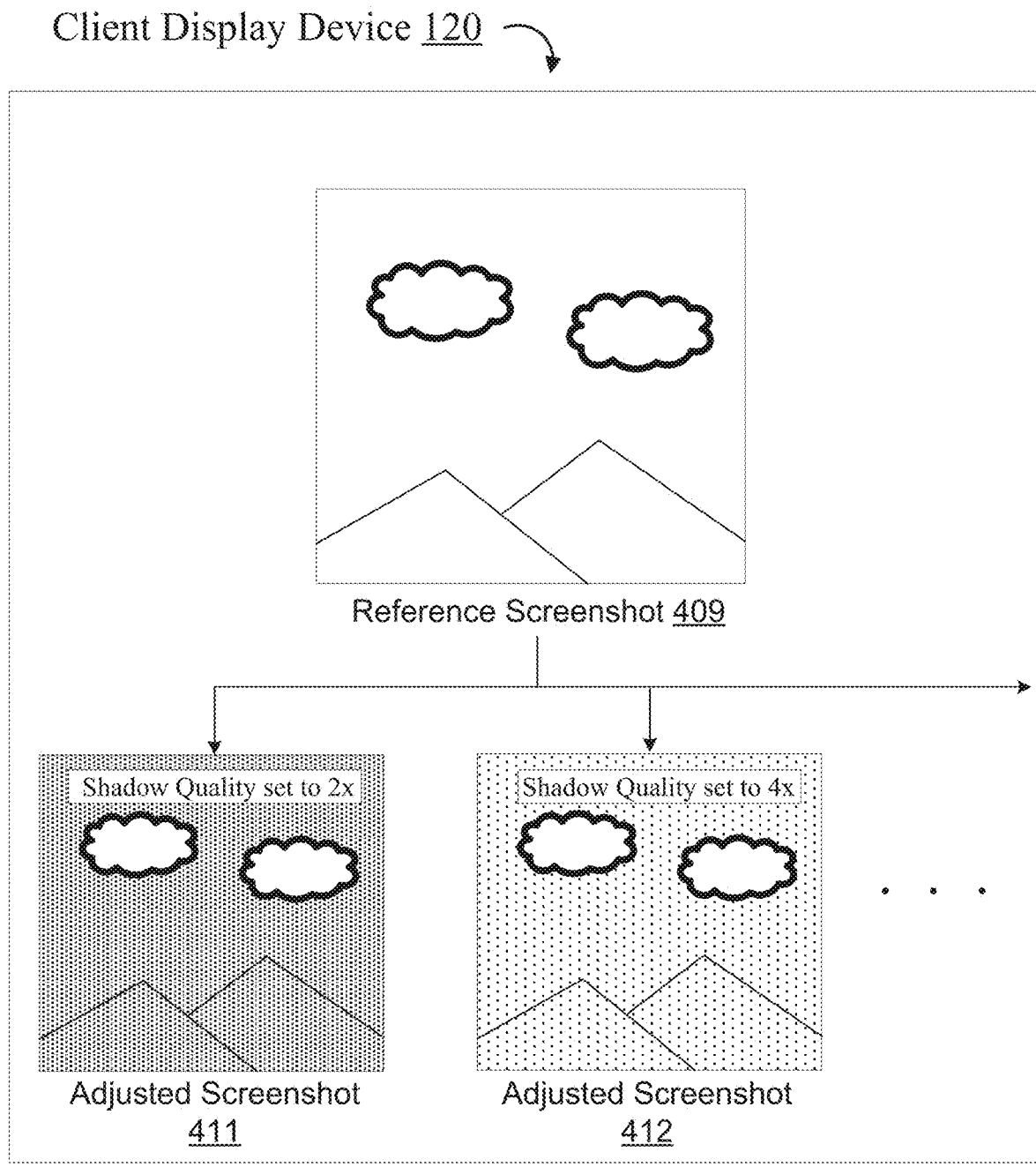
FIG. 3C depicts an exemplary training process which may be used in gathering more educated feedback from end-users in accordance with embodiments of the present invention.

FIG. 3C depicts an exemplary training process (e.g., training process 400) which may be used in gathering more educated feedback from end-users in accordance with embodiments of the present invention. For instance, as illustrated by the embodiment depicted in FIG. 3C, end-users may be trained to recognize various image quality contribution levels (weights) associated with different application parameters and how they may impact the overall image quality of frames rendered on the client device for a particular application.

As illustrated in FIG. 3C, reference screenshot 409 may represent a screenshot associated with a particular application. As such, visual representations of the scene depicted within reference screenshot 409 may be adjusted based on pre-determined settings (e.g., determined by a host computer system) to train the end-user to recognize and differentiate the various image quality contribution levels (weights) associated with a particular adjustable application parameter (e.g., shadow quality). In this manner, end-users may be trained to recognize how adjusting the levels of a parameter (e.g., setting shadow quality to 2×, 4×, etc.) may impact the overall image quality of frames rendered on the client device for an application (e.g., adjusted screenshot 411, 412, etc.). In one embodiment, end-users may be presented with frames reflecting adjustments to multiple application parameters (e.g., anisotropic filtering, anti-aliasing, etc.). As such, end-users may be capable of providing more informed feedback when prompted by embodiments of the present invention.

Accordingly, with reference to FIGS. 3A, 3B and/or 3C, a listing of application parameter "weights" for all parameters that impact image quality, in which parameter weights are user-defined, may be communicated to a remote server system along with any hardware and/or software configurations associated with the end-user's particular client device.

FIG. 4A depicts an exemplary network communication between a host computer system and a plurality of remote client devices in which image quality contribution determinations made by a plurality of end-users may be communicated from each end-user's respective client device to a host computer system in accordance with embodiments of the present invention. Application 236 (e.g., video game) may include a set of adjustable application parameters that may be adjusted by end-users for purposes of maximizing their enjoyment of application 236. In this manner, applications 236-1, 236-2, and 236-3 may be separate instantiations of application 236 that may be separately executed by client devices 100-1, 100-2, and 100-3 (respectively) and capable of providing different sets of image quality contribution scores based on the subjective determinations made by each end-user using those respective devices.

As illustrated by the embodiment depicted in FIG. 4A, host device 200 may be configured to periodically receive a plurality of log files (e.g., log files 140-1, 140-2, 140-3) generated locally on client devices 100-1, 100-2, and/or 100-3 over a communications network (e.g., network 305). In one embodiment, log files 140-1, 140-2, 140-3 may each include a set of image quality contribution scores (e.g., image quality contribution data 136-1, 136-2, 136-3, etc.) associated with application 236 that may be based on subjective determinations made by end-users of each respective client device. As such, according to one embodiment, image quality contribution scores may be calculated by the image quality scoring modules of each client device (e.g., image quality scoring modules 143-1, 143-2, 143-3, etc.) and stored on log files (e.g., log files 140-1, 140-2, 140-3) generated by each client devices 100-1, 100-2, and/or 100-3 for use in server-side analysis and/or optimization procedures performed by host device 200.

With further reference to the embodiment depicted in FIG. 4A, log files 140-1, 140-2, and 140-3 may also include data concerning time-varying performance parameters (e.g. frames/second or "FPS", power consumption, etc.) associated with the execution of an application. For example, an end-user may prefer to execute application 236 at a preferred FPS rate (e.g., 60 FPS) when using a preferred combination of adjusted application parameter settings. As such, the image quality contribution scores received by host device 200 from client devices 100-1, 100-2, and 100-3 may also include pre-determined FPS rates that an end-user considers acceptable (e.g., minimum/maximum acceptable FPS rates, average FPS rates, etc.) for executing application 236 using a preferred combination of adjusted application parameter settings.

Also, log files 140-1, 140-2, 140-3 may also include client device metadata (e.g., metadata 135-1, metadata 135-2, metadata 135-3, etc.) that store various hardware and/or software configurations associated with each client device (e.g., client devices 100-1, 100-2, 100-3, etc.). According to one embodiment, client device metadata may include definitions concerning hardware configuration information (e.g., monitor resolution, CPU information, GPU information, etc.), software configuration information (e.g., operating system) and the like.

Exemplary Method for Generating Optimal Image Quality Settings Using Subjective End-User Feedback Received from a Client Device Based on feedback received from end-users, embodiments of the present invention may be capable of determining optimal image quality settings for executing an application on the end-user's client device. According to one embodiment, image quality contribution data, predetermined performance parameter data (e.g., user-defined FPS rates), and/or client device metadata gathered from client devices may be used by a host computer system (e.g., host device 200) to generate optimal image quality settings for executing application (e.g., application 236) on each respective client device.

Figure 4B:
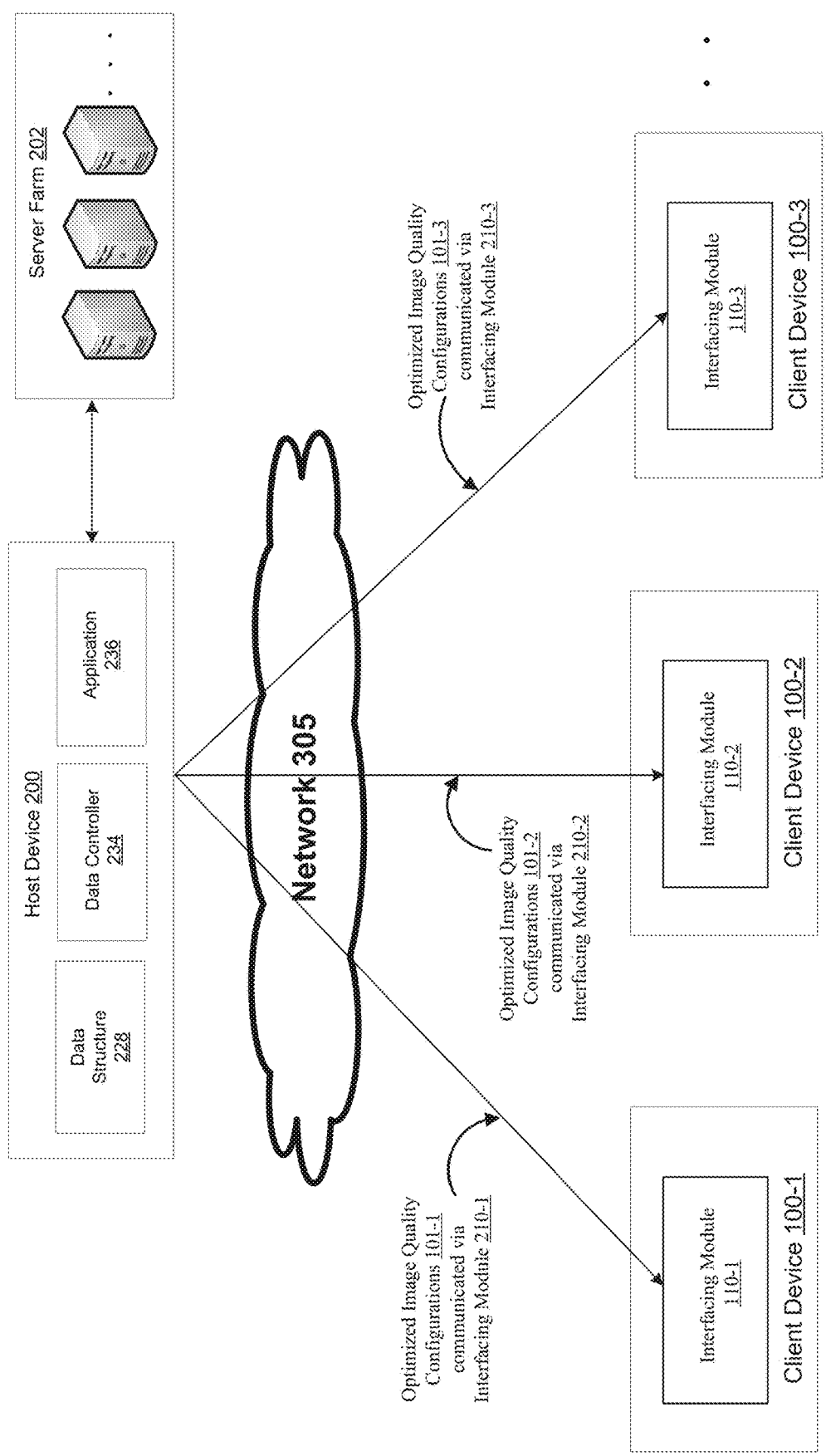
FIG. 4B depicts an exemplary network communication between a host device and a plurality of remote client devices for communicating optimized image quality settings generated using subjective end-user feedback received in accordance with embodiments of the present invention.

For instance, with reference to FIG. 4B, data within log files received from client devices 100-1, 100-2 and 100-3 (e.g., see FIG. 4A) may be aggregated and stored within a database resident on host device 200 (e.g., data structure 228) which may be accessible to data controller 234. As such, in one embodiment, data controller 234 may include the functionality to access stored image quality contribution scores (e.g., image quality contribution data 136-1, 136-2, 136-3, etc.), user-defined FPS rates (e.g., minimum/maximum FPS rates, average FPS rates, etc.) and/or client device metadata gathered from client devices 100-1, 100-2 and/or 100-3 and communicate the data to server fare 202. In this manner, data controller 234 and/or server farm 202 may be capable of performing optimization procedures that can generate optimal image quality settings for client devices 100-1, 100-2 and/or 100-3 to execute application 236 responsive to feedback expressed by their respective end-users.

As described herein, computer systems within server farm 202 may represent a vast array of hardware and/or software profiles that may be capable of executing application 236 using a multitude of different settings. Accordingly, data controller 234 may estimate which hardware and/or software profile or profiles from server farm 202 best matches the hardware and/or software configuration of an end-user's client device (e.g., client devices 100-1, 100-2, 100-3, etc.) when performing optimization procedures. Further information and details regarding selection of hardware and/or software configurations may be found with reference to pending U.S. patent application Ser. No. 13/543,184 entitled "SYSTEM, METHOD, AND COMPUTER PROGRAM PRODUCT FOR DETERMINING WHETHER PARAMETER CONFIGURATIONS MEET PREDETERMINED CRITERIA," which was filed on Jul. 6, 2012 by inventor John Spitzer and which is incorporated herein by reference in its entirety.

Furthermore, image quality and performance (e.g., FPS) have an inverse relationship such that decreased FPS levels may correspond with increased image quality levels and vice-versa. As such, embodiments of the present invention may use empirical data concerning the relationship between performance and image quality to generate a set of predetermined optimal settings ("presets") that may provide end-users with a range of settings capable of providing various degrees of optimal image quality with respect to different FPS rates. For instance, in one embodiment, hardware and/or software profiles selected by data controller 234 from server farm 202 for a particular client device may separately calculate performance degradations associated with the image quality contribution data received from the client device. As such, different optimized image quality settings may exist for a set of adjustable application parameters associated with application 236, and a plurality of different optimal image quality setting levels may be determined for and assigned to each variation.

In one embodiment, the plurality of image quality settings levels may be determined by calculating a monotonic set of presets for each variation of the plurality of predefined parameters. Further information and details regarding exemplary methods of generating optimal image quality settings for whatever performance level the end-user desires may be found with reference to pending U.S. patent application Ser. No. 13/543,196 entitled "SYSTEM, METHOD, AND COMPUTER PROGRAM PRODUCT FOR SIMULTANEOUSLY DETERMINING SETTINGS FOR A PLURALITY OF PARAMETER VARIATIONS," which was filed on Jul. 6, 2012 by inventors John Spitzer, Yury Urlasky and Rev Lebaredian, and which is incorporated herein by reference in its entirety. For instance, in one embodiment, server farm 202 may use the hardware and/or software profiles selected by data controller 234 in addition to image quality contribution scores and/or user-defined FPS rates received from a client device as inputs to compute a set of presets for client devices. According to one embodiment, presets computed by server farm 202 may undergo benchmark testing to evaluate the acceptability of image quality settings determined for each client device. Accordingly, as illustrated in FIG. 4B, in one embodiment, each client device may receive a set of benchmarked optimized image quality presets computed by host device 200 (e.g., optimized image quality configurations 101-1, 101-2, 101-3, etc.).

According to one embodiment, benchmark testing may be performed locally on an end-user's client device. For instance, in one embodiment, host device 200 may communicate benchmark tests, which may be performed directly on the end-user's client device. In one embodiment, benchmark tests performed may be configured to execute automatically without end-user interaction. In this manner, benchmarks performed on the end-user's client device may improve upon the optimized image quality settings generated by server farm 202 using the existing hardware/software configuration of the end-user's client device.

Figure 4C:
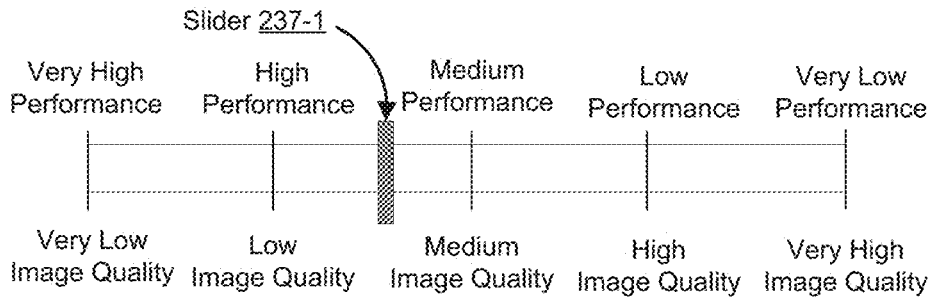
FIG. 4C depicts an exemplary set of optimized image quality presets computed by a host device responsive to feedback expressed by end-users in accordance with embodiments of the present invention.
Figure 4C:
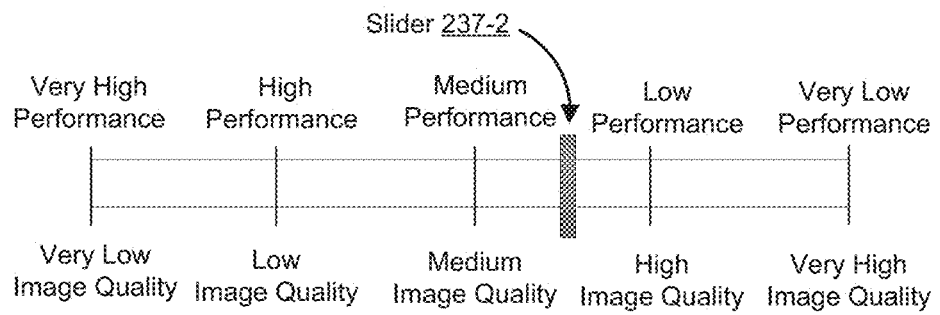
Figure 4C:
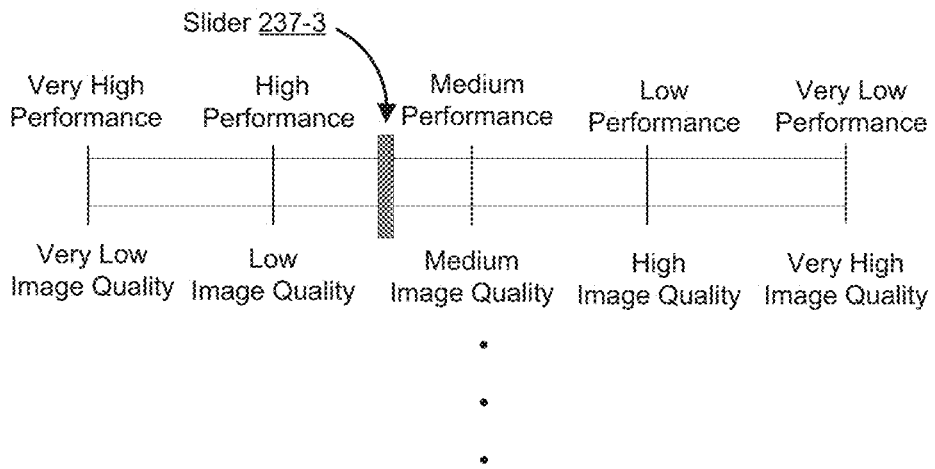

FIG. 4C depicts an exemplary set of optimized image quality presets communicated to a client device that were computed by host device 200 for a plurality of parameters responsive to feedback expressed by end-users in accordance with embodiments of the present invention. As illustrated by the embodiment depicted in FIG. 4C, a plurality of application parameters (e.g., shadow quality, water quality, texture quality, etc.) may each include 5 different predetermined settings or "presets" (e.g., "very high performance/very low image quality", "high performance/"low image quality", etc.) which may provide end-users with a range of settings that are capable of providing various degrees of optimal image quality with respect to different FPS rates. The relative positions of sliders 237-1, 237-2, and/or 237-3 within FIG. 4C may each represent an optimal setting calculated by host device 200 for a particular parameter based on subjective feedback provided by the end-user (e.g., user-defined FPS, user-defined parameter "weights", etc.). Furthermore, as illustrated in FIG. 4C, an end-user may adjust settings via slider 237-1 based on a given preference.

Figure 5:
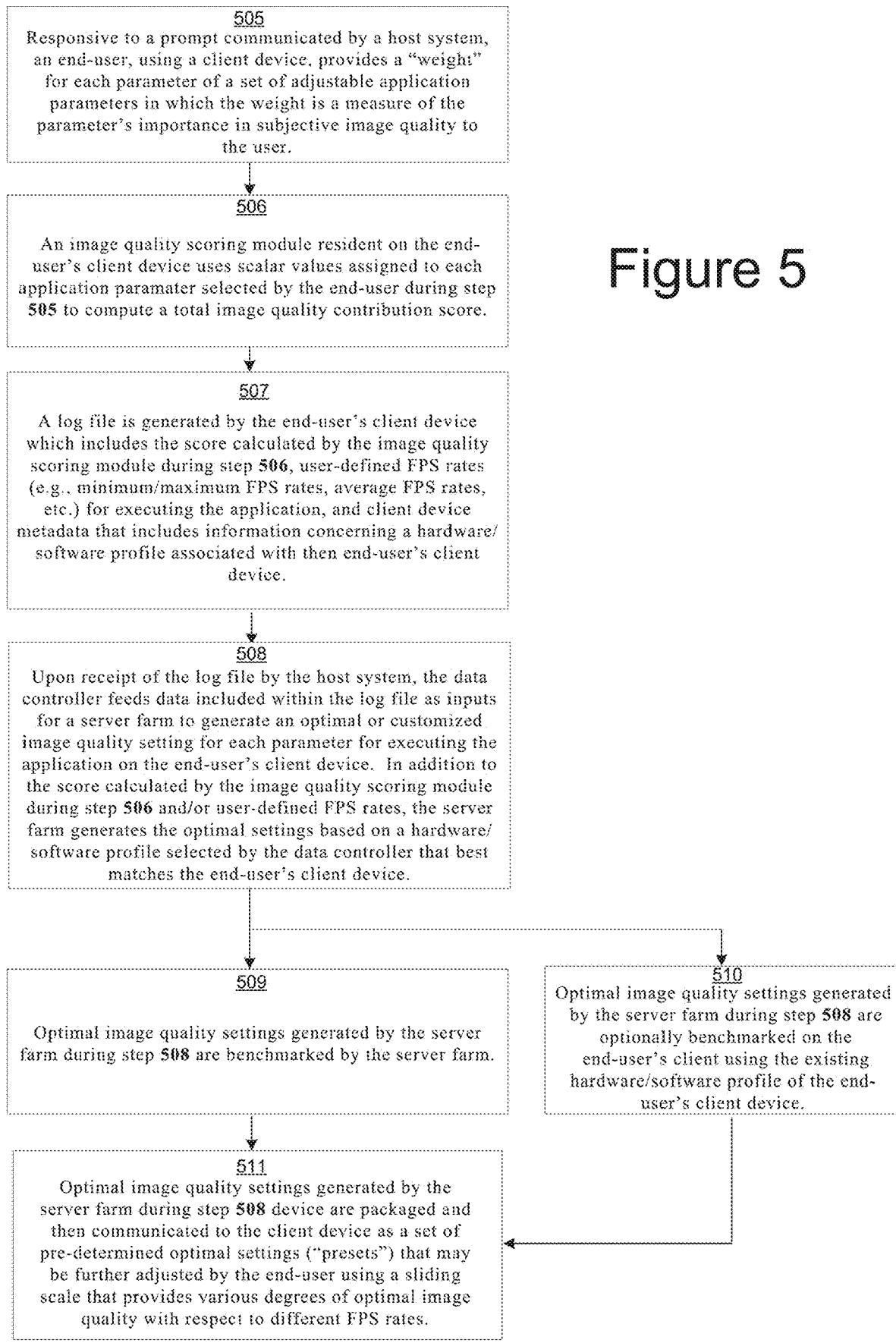
FIG. 5 is a flow chart depicting an exemplary computer-implemented process of optimizing image quality settings of an application responsive to feedback received from an end-user in accordance with embodiments of the present invention.

FIG. 5 is a flow chart depicting an exemplary computer-implemented process of optimizing image quality settings of an application responsive to feedback received from an end-user in accordance with embodiments of the present invention.

At step 505, responsive to a prompt communicated by a host system, an end-user, using a client device, provides a "weight" for each parameter of a set of adjustable application parameters in which the weight is a measure of the parameter's importance in subjective image quality to the user.

At step 506, an image quality scoring module resident on the end-user's client device uses scalar values assigned to each application parameter selected by the end-user during step 505 to compute a total image quality contribution score.

At step 507, a log file is generated by the end-user's client device which includes the score calculated by the image quality scoring module during step 506, user-defined FPS rates (e.g., minimum/maximum FPS rates, average FPS rates, etc.) for executing the application, and client device metadata that includes information concerning a hardware/software profile associated with then end-user's client device.

At step 508, upon receipt of the log file by the host system, the data controller feeds data included within the log file as inputs for a server farm to generate an optimal or customized image quality setting for each parameter for executing the application on the end-user's client device. In addition to the score calculated by the image quality scoring module during step 506 and/or user-defined FPS rates, the server farm generates the optimal settings based on a hardware/software profile selected by the data controller that best matches the end-user's client device.

At step 509, optimal image quality settings generated by the server farm during step 508 are benchmarked by the server farm.

At step 510, optimal image quality settings generated by the server farm during step 508 are optionally benchmarked on the end-user's client using the existing hardware/software profile of the end-user's client device.

At step 511, optimal image quality settings generated by the server farm during step 508 device are packaged and then communicated to the client device as a set of predetermined optimal settings ("presets") that may be further adjusted by the end-user using a sliding scale that provides various degrees of optimal image quality with respect to different FPS rates.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because much other architecture can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system.

These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above disclosure. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method comprising:
presenting, using a client device, one or more videos comprising one or more video clips, the one or more video clips generated using an application that renders graphics using in-application settings in the application;
receiving, using the client device, user feedback indicative of one or more selections of relative levels of the in-application settings;
determining, using the client device and based at least on the relative levels, scalar values associated with the in-application settings, the scalar values indicating an importance for a first setting of the in-application settings relative to a second setting of the in-application settings;
determining, using the client device and based at least on the scalar values, an image quality score associated with the in-application settings;
sending, using the client device and to a remote system, first data representing the image quality score associated with the in-application settings;
receiving, using the client device and from the remote system, second data representing image quality settings for the in-application settings that are based at least on the image quality score; and
modifying, using the client device and based at least on the image quality settings, at least the first setting of the in-application settings in the application to cause the application to render the graphics in accordance with the first setting as modified.

2. The method of claim 1, wherein the application renders the graphics depicted in the one or more videos at a common frame rate and the one or more videos are presented at the common frame rate.

3. The method of claim 1, wherein the application renders the graphics depicted in the one or more videos at a common frame rate based at least on a preference expressed by a user.

4. The method of claim 1, wherein the presenting comprises displaying the one or more videos and prompting a selection of a desirable configuration level for pre-defined settings that corresponds to a video clip of the one or more video clips.

5. The method of claim 1, wherein the presenting is at least one of:
during execution of the application; or
at completion of an application session of the application.

6. The method of claim 1, wherein the one or more videos is a plurality of videos, and wherein the presenting comprises displaying the plurality of videos simultaneously.

7. The method of claim 1, wherein the one or more video clips are rendered by the application at least partially at a remote server system.

8. The method of claim 1, further comprising:
sending third data representing hardware configuration information and software application settings information associated with the client device to the remote system,
wherein the image quality settings are determined using the remote system and based at least on the third data and the image quality score.

9. The method of claim 1, wherein:
the relative levels include at least a first level associated with the first setting and a second level associated with the second setting; and
the scalar values include at least a first scalar value that is determined based at least on the first level and a second scalar value that is determined based at least on the second level.

10. The method of claim 9, wherein the first setting includes a greater importance than the second setting based at least on the first scalar value being greater than the second scalar value.

11. The method of claim 1, further comprising:
receiving, using the client device, an input indicating a value of a performance level associated with the application, wherein:
the first data further represents of the value of the performance level; and the image quality settings are further based at least on the value of the performance level.

12. A method comprising:

determining, using a remote system, different configurations of in-application settings of a graphics rendering application;

based at least on user input provided in response to presentation of one or more video clips generated using the graphics rendering application based at least on the different configurations of the in-application settings, receiving, using the remote system and from a client device, first data representing an image quality score associated with the in-application settings, the image quality score determined based at least on scalar values indicating an importance for a first setting of the in-application settings relative to a second setting of the in-application settings, the scalar values determined based at least on input data indicating one or more relative levels of the in-application settings;

determining, based at least on the image quality score, one or more values for the in-application settings; and sending, using the remote system and to the client device, second data defining the one or more values for the in-application settings, wherein the second data causes the graphics rendering application to modify the in-application settings to render graphics in accordance with the second data.

13. The method of claim 12, wherein the receiving the first data is based at least on a prompt communicated to the client device to define a desirable setting level of the in-application settings.

14. The method of claim 12, wherein the graphics are rendered at the client device.

15. The method of claim 12, further comprising:

receiving hardware configuration information and software application settings information associated with the client device, wherein the one or more values are further based at least on the hardware configuration information and the software application settings information.

16. The method of claim 12, wherein the application is a video game and the in-application settings are in-game settings of the video game.

17. A system comprising:

one or more processing units to:

receive, using a client device, user feedback selecting relative levels of in- application settings for an application that renders graphics using the in-application settings;

determine, using the client device, scalar values that are associated with the relative levels, the scalar values indicating an importance for a first setting of the in-application settings relative to a second setting of the in-application settings;

determine, using the client device and based at least on the scalar values, an image quality score associated with the in-application settings;

send, using the client device, first data representing the image quality score for the in-application settings;

receive, using the client device, second data representing image quality settings for the in-application settings that are based at least on the image quality score; and cause the application to modify the in-application settings based at least on the second data to generate modified in-application settings.

18. The system of claim 17, wherein:

the relative levels include at least a first level associated with the first setting and a second level associated with the second setting; and the scalar values include at least a first scalar value that is determined based at least on the first level and a second scalar value that is determined based at least on the second level.

19. The system of claim 17, wherein the one or more processing units are further to:

present content using an application that renders the graphics using the in-application settings in the application, wherein the user feedback is received based at least on the presentation of the content using the application.

20. The system of claim 17, wherein the one or more processing units are further to:

receive an input indicating a value of a performance level associated with the application, wherein:

the first data further represents of the value of the performance level; and the image quality settings are further based at least on the value of the performance level.

* * * * *